United States Patent [19]
Akiba et al.

[11] Patent Number: 5,588,244
[45] Date of Patent: *Dec. 31, 1996

[54] FISHING ROD WITH A PRE-INSERTED FISHING LINE GUIDE MEMBER

[75] Inventors: Masaru Akiba; Tomoyoshi Tsurufuji, both of Saitama, Japan

[73] Assignee: Daiwa Seiko, Inc., Tokyo, Japan

[*] Notice: The term of this patent shall not extend beyond the expiration date of Pat. No. 5,299,377.

[21] Appl. No.: 277,315

[22] Filed: Jul. 22, 1994

[30] Foreign Application Priority Data

Jul. 30, 1993  [JP]  Japan ................. 5-045854 U

[51] Int. Cl.$^6$ ........................................... A01K 87/04
[52] U.S. Cl. ............................................ 43/24; 43/18.1
[58] Field of Search ............................... 43/18.1, 24

[56] References Cited

U.S. PATENT DOCUMENTS

| | | | |
|---|---|---|---|
| 2,776,516 | 1/1957 | Jennette | 43/24 |
| 3,314,186 | 4/1967 | Viveiros | 43/24 |
| 3,325,938 | 6/1967 | Minera | 43/24 |
| 3,432,958 | 3/1969 | Bellinger | 43/24 |
| 3,862,509 | 1/1975 | Petersen, Jr. | 43/24 |
| 4,067,133 | 1/1978 | Livingston | 43/18.1 |
| 4,183,163 | 1/1980 | Reimer | 43/24 |
| 4,212,126 | 1/1980 | Barnett | 43/24 |
| 5,035,074 | 7/1991 | Tylkowski | 43/24 |
| 5,299,377 | 4/1994 | Akiba | 43/18.1 |

FOREIGN PATENT DOCUMENTS

| | | | |
|---|---|---|---|
| 249360 | 1/1964 | Australia | 43/24 |
| 1220089 | 5/1960 | France | 43/24 |
| 4-117232 | 4/1992 | Japan . | |
| 5-3737 | 1/1993 | Japan . | |
| 22321 | of 1909 | United Kingdom | 43/24 |
| 1259820 | 1/1972 | United Kingdom | 43/24 |

OTHER PUBLICATIONS

Patent Abstracts of Japan; vol. 16, No. 362 (C–0971); 5 Aug. 1992.
Patent Abstracts of Japan; vol. 17, No. 190 (C–1048); 14 Apr. 1993.
Patent Abstracts of Japan; vol. 17, No. 259 (C–1061); 21 May 1993.

*Primary Examiner*—Kurt Rowan
*Attorney, Agent, or Firm*—Longacre & White

[57] ABSTRACT

The invention provides a fishing rod with a pre-inserted fishing line guide member which can reduce the resistance of a fishing line during casting and reeling operations. Thereby an operator is able to play out and draw in the fishing line smoothly. In the fishing rod, the whole periphery of the inner surface of a fishing line guide cylinder is mounted on the leading end portion of a fishing rod pipe. The line guide is enlarged in diameter more greatly than the inner periphery contour of the leading end portion of the fishing rod pipe when the latter is extended in the direction of the axis of the rod pipe. The lower inner surface of the fishing line guide cylinder is downwardly shifted with respect to the fishing rod end pipe and enlarged in diameter more greatly than the oppositely located and upwardly enlarged diameter of the upper inner surface with respect to the axis of the fishing rod. A wear resisting guide member including an inner peripheral surface formed as a curved surface may also be mounted on the leading end portion of the enlarged lower inner surface of the fishing line guide cylinder. In addition, a second wear resisting fishing line guide member can be mounted near or to the terminal end of the fishing rod pipe to further reduce wear and contact between the fishing line and the end portion of the rod pipe. A selected one of several of the fishing line guides can be chosen for a given fishing condition by virtue of the removable attachment of the fishing line guide to the fishing rod end pipe.

13 Claims, 4 Drawing Sheets

5,588,244

FISHING ROD WITH A PRE-INSERTED FISHING LINE GUIDE MEMBER

BACKGROUND OF THE INVENTION

1. Field of the Invention

The present invention relates to a fishing rod with a pre-inserted fishing line guide member which includes an enlarged diameter cylindrical portion capable of reducing the resistance of a fishing line when the fishing line is played out and drawn in through the fishing rod during a fishing operation.

2. Description of the Prior Art

In Japanese Patent Publication No. 5-3737 of Heisei, there is disclosed a fishing rod with a pre-inserted fishing line guide member which includes an enlarged diameter cylindrical portion capable of reducing the resistance of a fishing line when the fishing line is played out and drawn in through the leading end of the fishing rod during a fishing operation. In particular, the 5-3737 publication discloses a structure in which a fishing rod includes an opening formed in the leading end portion thereof and which opening is enlarged in the leading end direction. An enlarged diameter cylindrical member, uniform in the circumferential direction thereof, and made of ceramics is mounted on the inner surface of the leading end portion thereof. The structure disclosed in the present 5-3737 publication prevents the fishing line from being in contact with the steep or sharp corner portion of the rod structure and, therefore, this structure can reduce the damage of the fishing line in this sense.

SUMMARY OF THE INVENTION

Generally, when a fishing line is played out or drawn in during a fishing operation, the behavior and contact of the fishing line is widely distributed in the leading end portion of a fishing rod. That is, since tension is applied to the fishing line and the speed of the fishing line varies when it is played out and drawn in, as shown in FIG. 6, the fishing line behaves in a meandering manner in the enlarged diameter cylindrical portion of the leading end portion of the fishing rod. However, in the above-mentioned conventional fishing rod in the 5-3737 publication, the behavior range of the fishing line does not coincide with the shape of the enlarged diameter cylindrical portion and, during the fishing operation, the fishing line can be contacted strongly and widely with the inner surface of the enlarged diameter cylindrical portion of the rod or with the ceramics ring, which increases the resistance of the fishing line.

In view of the above, it is an object of the invention to provide a fishing rod with a pre-inserted fishing line guide member which can reduce the frictional resistance of a fishing line to thereby allow the fishing line to be played out and drawn in smoothly. Also, it is another object of the invention to provide a fishing rod with a pre-inserted fishing line guide member which allows the leading end portion thereof to be made compact and light in weight.

In attaining the above objects, according to one aspect of the invention, there is provided a fishing rod with a pre-inserted fishing line guide member in which the whole periphery of the inner surface of a fishing line guide cylinder mounted on the leading end portion of a rod pipe is enlarged in diameter more greatly than the inner peripheral contour of the rod pipe leading end portion when it is extended in the direction of the axis of the rod pipe. The lower inner surface of the fishing line guide cylinder is downwardly shifted and enlarged in diameter with respect to the above axis more greatly than the size of the upwardly enlarged diameter of the upper inner surface of the fishing line guide cylinder. A wear resisting guide member having a curved inner peripheral surface is provided at least in the leading end portion of the lower inner surface of the fishing line guide cylinder.

Also, according to another aspect of the invention, there is provided a fishing rod with a pre-inserted fishing line guide member in which the fishing guide cylinder has a transverse section shape which is long lengthwise, that is, small in the right-and-left or horizontal width thereof and proportionately large in the vertical dimension thereof.

Further, according to still another aspect of the invention, there is provided a fishing rod with a pre-inserted fishing line guide member in which the fishing line guide cylinder is mounted on the rod pipe leading end portion in such a manner that it can be freely rotated about the axis of the rod pipe.

When the fishing line guide cylinder is formed larger in diameter than the inner periphery of the rod pipe leading end portion, then the contact of the fishing line with the inner surface of the fishing line guide cylinder and with the guide member is decreased and weakened in the leading end portion of the fishing rod when the fishing line is played out and drawn in during the fishing operation, thereby being able to reduce the resistance of the fishing line. Also, in general, in the behavior of the fishing line during the fishing operation, when the fishing line is played out, in particular, during the latter range of the playing-out behavior, or when the fishing line is drawn in, the fishing line will be strongly contacted with the guide member inner periphery of the lower portion of the fishing line guide cylinder. According to the invention, however, because the lower inner surface of the fishing line guide cylinder is downwardly shifted and enlarged in diameter much more greatly than the size of the upwardly enlarged diameter of the upper inner surface of the fishing line guide cylinder, the resistance of the fishing line due to its strong contact with the guide member inner periphery can be reduced to a great extent.

Also, since the behavior of the fishing line during the fishing operation meanders mainly in the vertical direction but does little in the right and left direction, the width of the fishing line guide cylinder in the right and left direction can be set smaller than the width in the vertical direction thereof. And, the upper portion of the fishing line guide cylinder need not be so enlarged in diameter as the lower portion thereof, the upper portion can be set rather small. That is, although the leading end portion of the fishing rod is heavy in weight from the viewpoint of the operation of the fishing rod, because the unnecessary width of the fishing line guide cylinder in the right and left direction as well as the size of the upper portion thereof can be reduced in this manner, the leading end portion of the fishing line guide cylinder can be reduced in size and weight.

Further, when the fishing line guide cylinder is mounted on the leading end portion of the rod pipe in such a manner that it can be freely rotated about the axis of the rod pipe, regardless of whether the fishing rod is used in its normal state or upside down. The fishing line guide cylinder can be rotated such that the lower inner surface thereof can be always situated at the bottom and thus the fishing rod is stabilized due to the gravity with respect to the fishing line guide cylinder as well as due to the pulling action of the fishing line caused by the weight of a bait. This facilitates the fishing operation of the fishing rod.

In a further embodiment of the present invention a second wear reducing and fishing line friction reducing member associated with the line guide is inserted so as to abut directly against or near the end portion of the fishing rod end pipe. In this way, fishing line wear and friction is even further reduced from using the fishing line guide alone.

Also, electively the fishing line guide of the present invention can be easily replaced on the end section of a given fishing rod pipe. In this way, the fishing line guide can be selected to best suite a fishing style or condition.

DETAILED DESCRIPTION OF THE PREFERRED EMBODIMENT

Description will be given below in more detail of the invention by way of the embodiments thereof shown in the accompanying drawings.

Figure 1:
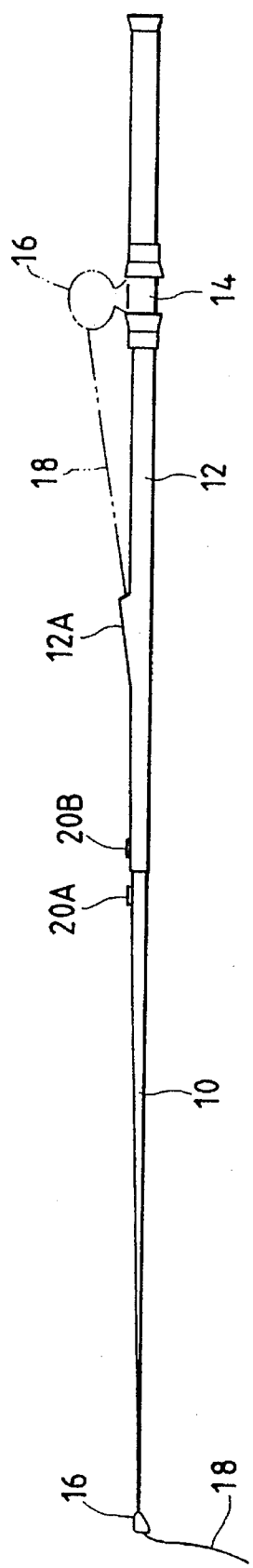
FIG. 1 is a side view of a first embodiment of a fishing rod with a pre-inserted fishing line guide member according to the invention.

FIG. 1 is a side view of a first embodiment of a fishing rod with a pre-inserted fishing line guide member according to the invention. In FIG. 1, a rod pipe is one of a type that a front rod 10 is connected to a base rod 12. A reel seat 14 is mounted on the base rod and a reel 16 is fixed to the reel seat 14.

A fishing line guide portion 12A is formed at an appropriate position in the base rod 12. A fishing line 18, which is drawn out from the reel 16, is passed through the fishing line guide portion 12A and further through the front rod 10 and is drawn externally from a fishing line guide cylinder 16 mounted on the leading end portion of the front rod 10.

The front rod 10 and base rod 12 are connected to each other. In order to ensure that the lower inner periphery 16D (see FIG. 2) (which will be described later) of the fishing line guide cylinder 16 mounted on the leading end portion of the front rod 10 is located at the bottom side, marks 20A and 20B for specifying directions are given on the connecting portions of the respective rod pipes. It should be noted here that the term "rod pipe" means the front rod 10 hereinafter.

Figure 3:
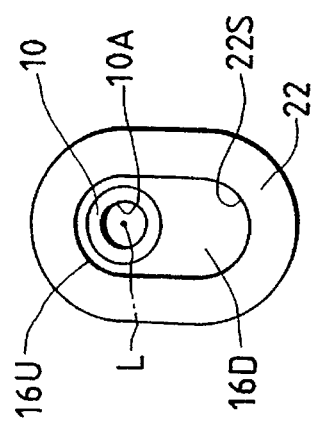
FIG. 3 is a front view of the fishing rod leading end portion when it is viewed from the direction of an arrow III shown in FIG. 2.
Figure 2:
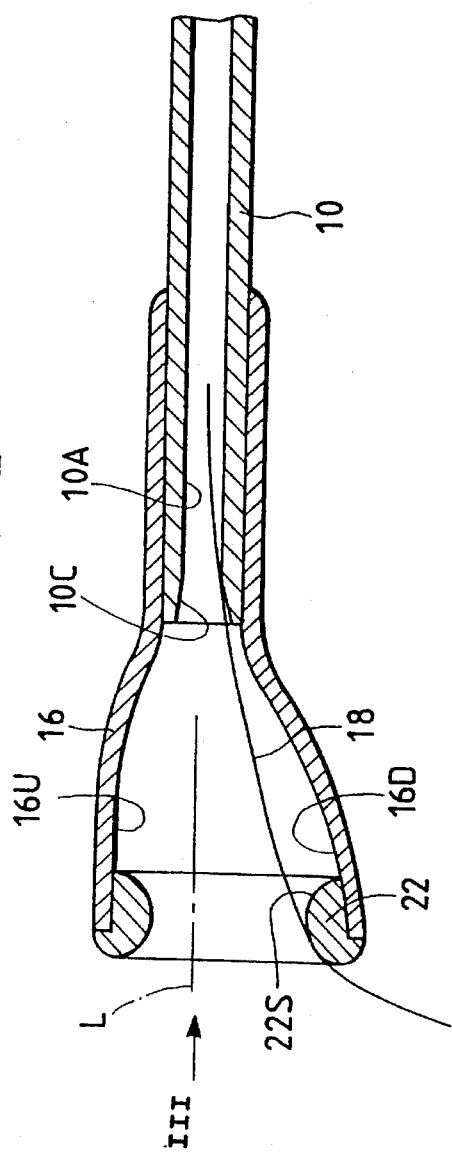
FIG. 2 is an enlarged longitudinal section view of the leading end portion of the fishing rod shown in FIG. 1.

FIG. 2 is an enlarged longitudinal section view of the leading end portion of the fishing rod. FIG. 3 is a front view of the fishing rod leading end portion when viewed from the direction of an arrow C shown in FIG. 2. In the present embodiment, the rear portion of the fishing line guide cylinder 16 is fixed to the rod pipe 10. The fishing line guide cylinder includes a bugle-like main body which is situated in front of the rod pipe 10 and the whole periphery of the inner surface of the fishing line guide cylinder main body is enlarged in diameter more greatly than the inner periphery 10A of the rod pipe 10 when it is extended in the direction of the axis L of the rod pipe 10.

Also, the lower inner surface 16D of the fishing line guide cylinder 16 is downwardly shifted and enlarged in diameter with respect to the axis L more greatly than the upper inner surface 16U. This relationship remains unchanged even when a wear resisting ceramics guide member 22 is mounted on the leading end portion of the inner surface of the fishing line guide cylinder 16. Further, the guide member 22 includes an inner peripheral surface 22S which is formed in such a curved surface as shown in FIG. 1, in order to prevent the fishing line 18 from being damaged even when the fishing line 18 is contacted with and is slid along the inner peripheral surface 22S as well as in order to be able to reduce the sliding resistance of the fishing line 18. Also, from the same viewpoint, the inner peripheral surface of the leading end portion of the rod pipe 10 is formed in a chamfered surface 10C.

Figure 6:
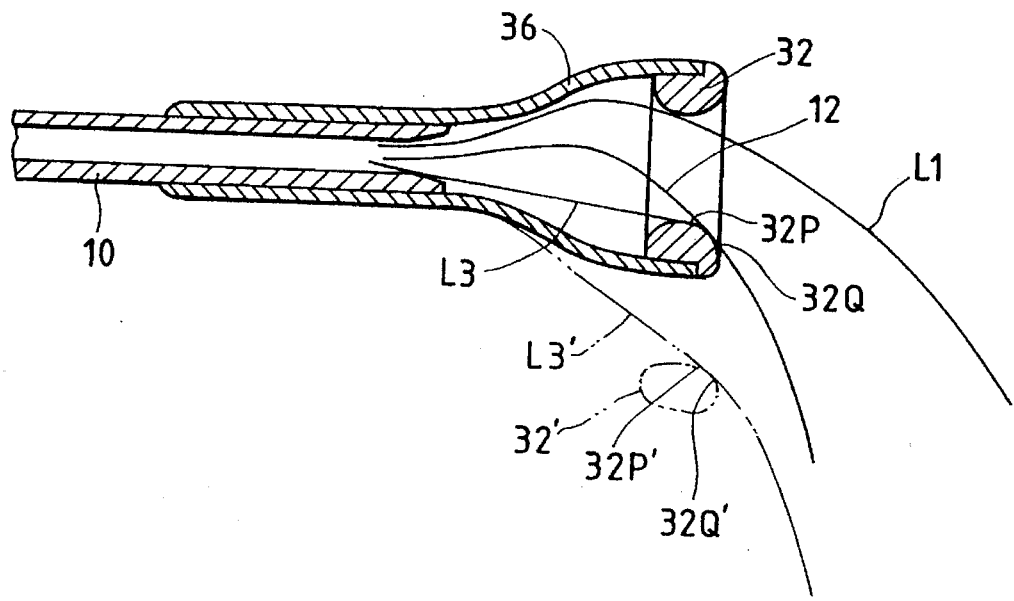

The reason why the fishing line guide cylinder 16 is formed in the above-mentioned manner will be described below with reference to FIG. 6.

When the fishing line is played out, due to the casting operation, the weight of a bait and the like, the fishing line is drawn out forwardly, obliquely and downwardly. That is, like a curved line L1 through a small diameter hole (inner periphery) in the leading end portion of the rod pipe. The shape of the curved line L1 varies according to the tension to be applied to the fishing line, the speed of the fishing line, the rigidity (class) of the fishing line and the like, and the fishing line can be drawn out like a curved line L2. For example, in the latter range of the fishing line casting operation, the speed of the fishing line goes down so that the fishing line behavior varies from the state of the curved line L1 to the state of the curved line L2.

On the other hand, when the fishing line is drawn in, the fishing line is drawn against the rod pipe linearly like a curved line L3 while it is in contact with the guide member 32. However, when the tension applied to the fishing line is small or when the speed of the fishing line is fast, the fishing line will be drawn against the rod pipe in such a manner that it is curved slightly upwardly as shown by the curved line L2.

As described above, the fishing line is played out and drawn in such that mostly it meanders vertically within the fishing line guide cylinder. When the upper inner surface of the fishing line guide cylinder is so formed as to include a space approximate to the shape of the curved line L1 that is the largest in the meandering curved lines of the fishing line, then the fishing line is in little contact with the inner surface and, therefore, the resistance of the fishing line during the fishing operation is reduced accordingly. Also, if the speed of the fishing line goes down when it is drawn in or cast, then the fishing line is contacted with the inner peripheral surface of the guide member 32 as shown by the curved lines L2 and L3.

Especially, in the case of the curved line L3, the fishing line is contacted along the curved surface of the guide member 32 between points 32P and 32Q in front of the linear portion and is thus changed in its direction before it is released externally. In the embodiment shown in FIG. 6 in which the upper and lower portions of the fishing line guide cylinder 36 are expanded in the same manner, in the case of the curved line L3, the included angle formed between the linear portion of the fishing line guide cylinder 36 and the external curved portion at the front and rear end points of the contact area of the fishing line with the guide member is large. Therefore, the sliding resistance of the fishing line is large.

However, if the lower portion of the fishing line guide cylinder is downwardly shifted and enlarged in diameter to a position 32' shown by a two-dot chained line, then the curved line L3 turns out to be a curved line L3' shown by a two-dot chained line, so that the distance between the two end points 32P' and 32Q' of the contact area with the guide member is shorter than the end points 32P and 32Q of the above-mentioned contact area. That is, the angle to be formed between the linear portion of the fishing line guide cylinder in the rear of the contact area and the curved portion existing externally of the fishing line guide cylinder just in front of the contact area is reduced to a considerable extent as shown in FIG. 6. Therefore, the sliding resistance of the fishing line can be reduced to a great extent.

In the foregoing description, there has been described the reason of the shape of the fishing line guide cylinder 16 which is shown in FIGS. 2 and 3. Further, the reason why the width of the fishing line guide cylinder 16 in the right and left direction thereof is smaller than the vertical width thereof as shown in FIG. 3 is that, as described before, the fishing line meanders mainly in the vertical direction and does little in the right and left direction. To set smaller the width of the fishing line guide cylinder in the right and left direction contributes to the reduction of the size and weight of the leading end portion of the fishing rod. As for the vertical height dimension of the fishing line guide cylinder, because the upper portion of the fishing line guide cylinder need not be so enlarged in diameter as the lower portion thereof, the width of the upper portion of the fishing line guide cylinder can be set smaller than that of the lower portion thereof, which can contribute to the reduction of the size and weight of the fishing rod leading end portion. The fishing rod including such a light leading end portion is improved in the operation thereof.

Next, a description will be given below of a second embodiment of a fishing rod according to the invention with referenced to FIGS. 4 and 5. In the second embodiment, similarly to the above-mentioned first embodiment, there is provided a fishing line guide cylinder 16' including a lower inner surface 16D' which is downwardly shifted and enlarged in diameter with respect to the axis L of the fishing rod more greatly than the upper inner surface 16U'. A ceramic guide member 22' is mounted on the lower portion of the leading end portion of the inner surface of the fishing line guide cylinder 16'. The guide member 22' includes an inner peripheral surface 22S' which is formed as a curved surface so as to allow the fishing line 18 to slide smoothly on the inner peripheral surface 22S'.

The fishing line guide cylinder 16' includes a rear portion 16A' which is fitted over a recessed portion 24A formed in a hold member 24, and the hold member 24 is in turn securely fixed to the leading end portion of the rod pipe 10. The fishing line guide cylinder 16' is free to rotate around the recessed portion 24A and, therefore, it is also free to rotate about the axis L of the fishing rod 10. When such direction specifying marks 20A and 20B as shown in FIG. 1 are not given, or when the marks are not used properly to match the direction of the fishing line guide cylinder to the marks even if they are given, the upper and lower portions of the fishing line guide cylinder 16' cannot always be oriented to the top and bottom of the gravity direction as desired, but the setting direction of the fishing line guide cylinder is infinitely adaptable to the orientation of least resistance to the passing fishing line.

In view of this, if the fishing line guide cylinder 16' is structured such that it can be freely rotated, then the lower inner surface 16D' of the fishing line guide cylinder 16' can be always situated at the bottom and is stabilized by itself due to the pulling action of the fishing line 18 caused by the gravity and the weight of a bait. As a result of this, similarly to the first embodiment, the resistance of the fishing line during the fishing operation can be reduced. Also, a guide member 26 formed of ceramics and having a circular section is mounted on the leading end of the hold member 24. And, since the fishing line 18 is guided in contact with the guide member 26 and the above-mentioned guide member 22' and not in contact with other portions of the fishing line guide cylinder, the resistance of the fishing line can be even further reduced.

Figure 5:
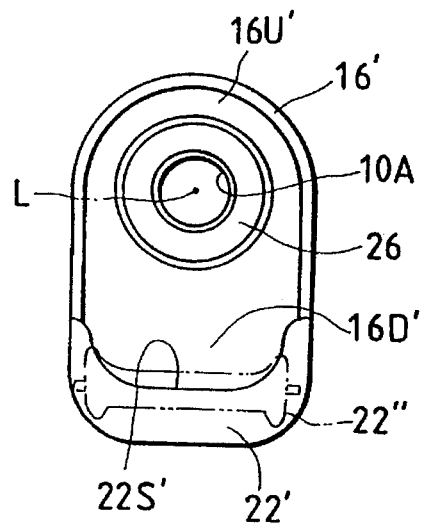
FIG. 5 is a front view of the leading end portion shown in FIG. 4, similar to FIG. 3; and, FIG. 6 is an illustration of the operation of the invention.

In FIG. 5, instead of the guide member 22' there is shown a guide roller 22" of ceramics by a two-dot chained line, which guide roller 22" is mounted rotatably with respect to the fishing line guide cylinder 16'. If the guide roller 22" is used, then the sliding resistance of the fishing line 18 can be further reduced.

Figure 7:
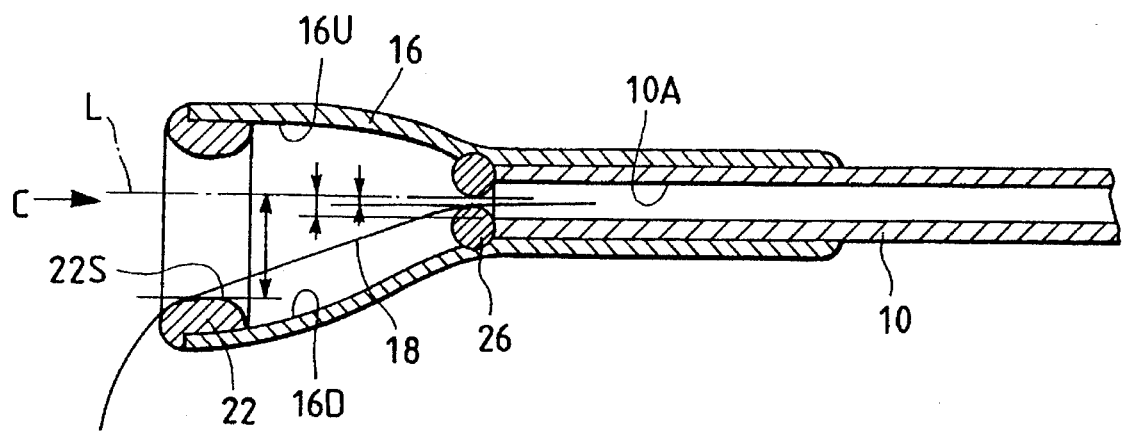
FIG. 7 is a modification of the present invention shown in FIG. 2.

FIG. 7 is a modification of the first embodiment shown in FIG. 2. The fishing line guide cylinder 16 has a second wear resisting ceramic guide member 26 in the form of a ring for guiding the fishing line 18. The first guide member 22 and the second guide member 26 cooperatively define a path for the fishing line 18.

The second wear resisting member 26 is fixed onto an internal surface of the guide cylinder 16 and is brought in abutment with a longitudinal terminus of the rod pipe 10. Further, a distance between the longitudinal axis L and an inner curved surface of the guide member 26 is set larger than a distance between the longitudinal axis L and an inner circumference of the rod pipe 10. It is, therefore possible to more surely prevent any destructive contact of the fishline 18 with an edge on the terminus of the rod pipe 10.

The first wear resisting member 22 and the second wear resisting member 26 cooperatively define a path for the fishing line 18 such that the path is enlarged toward a leading end of the guide cylinder 16 from the terminus of the rod pipe 10. A third wear resisting member may be further arranged on the guide cylinder 16 between the first and second wear resisting member 22 and 26 as long as the third wear resisting member meets with a requirement that a minimum distance between the longitudinal axis and the inner peripheral surface of the third wear resisting member is smaller than a minimum distance between the longitudinal axis and an inner peripheral surface of a wear resisting member located further from the terminus than the third wear resisting member.

Figure 4:
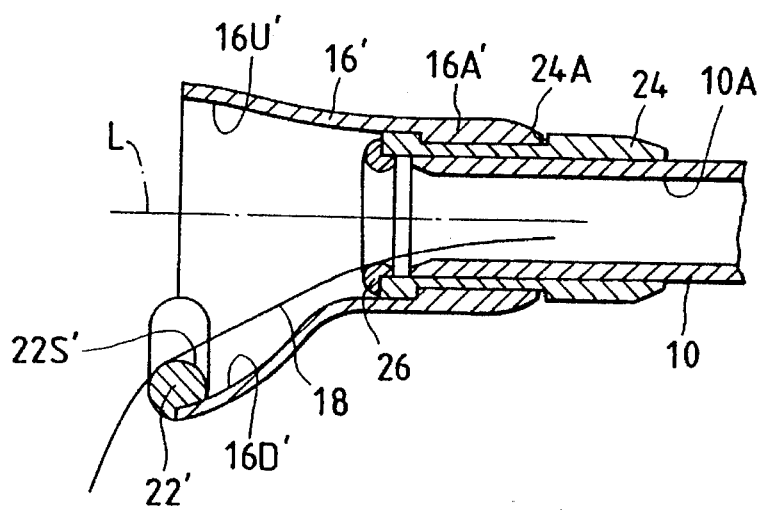
FIG. 4 is an enlarged longitudinal section view of a second embodiment of a fishing rod with a pre-inserted fishing line guide member according to the invention.
Figure 8:
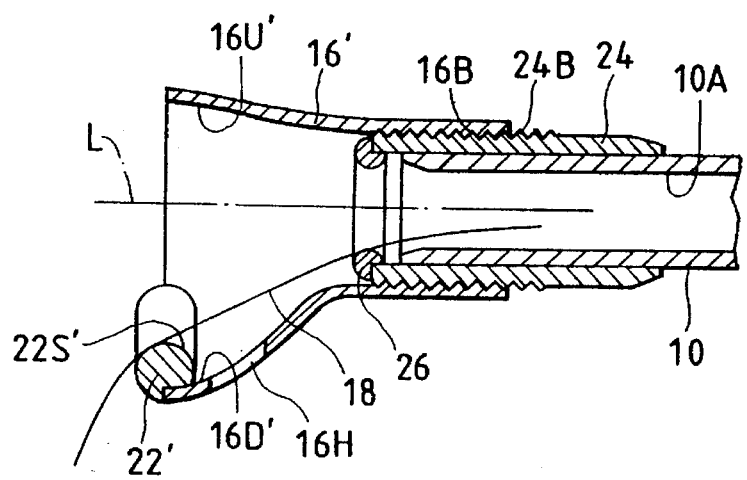
FIG. 8 is a modification of the present invention shown in FIG. 4.

FIG. 8 is a modification of the second embodiment shown in FIG. 4. A male thread 24 B is formed on an outer circumference of the holding member 24, and a female thread 16B is formed on an inner circumference of the guide cylinder 16', so that the guide cylinder 16' can be detachably mounted on rod pipe 10 through the hold member 16'. In addition, a through-hole 16H is formed through the guide cylinder 16' at the lower inner surface 16D thereof so as to discharge water accumulated behind the guide member 22'.

Figure 9:
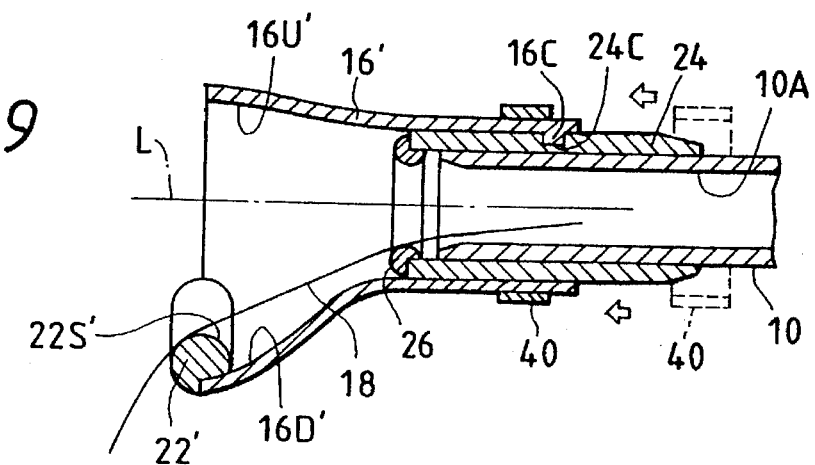
FIG. 9 is also a modification of the present invention shown in FIG. 4.

FIG. 9 is also a modification of the second embodiment shown in FIG. 4. This embodiment also has a feature that the guide cylinder 16' is detachable from the rod pipe 10. Instead of the formation of the male and female threads, this embodiment utilizes an engagement between a claw 16C and recess 24C. More specifically, two longitudinal slits (not shown) are formed in an upper portion of the guide cylinder 16' so that an elastically deformable arm having a claw 16C is defined between the slits. The holder member 24 is formed with a recess 24C adapted to engage with the claw 16C. Sliding the guide cylinder 16' on the hold member 24 causes the arm having the claw 16C to first be elastically deformed radially outwardly and then restored radially inwardly to engage with the recess 24C. Thereafter, a ring 40 is fitted over the guide cylinder 16' as indicated by an arrow in FIG. 9 so as to maintain the engagement between the claw 16C and the recess 24C.

Figure 10:
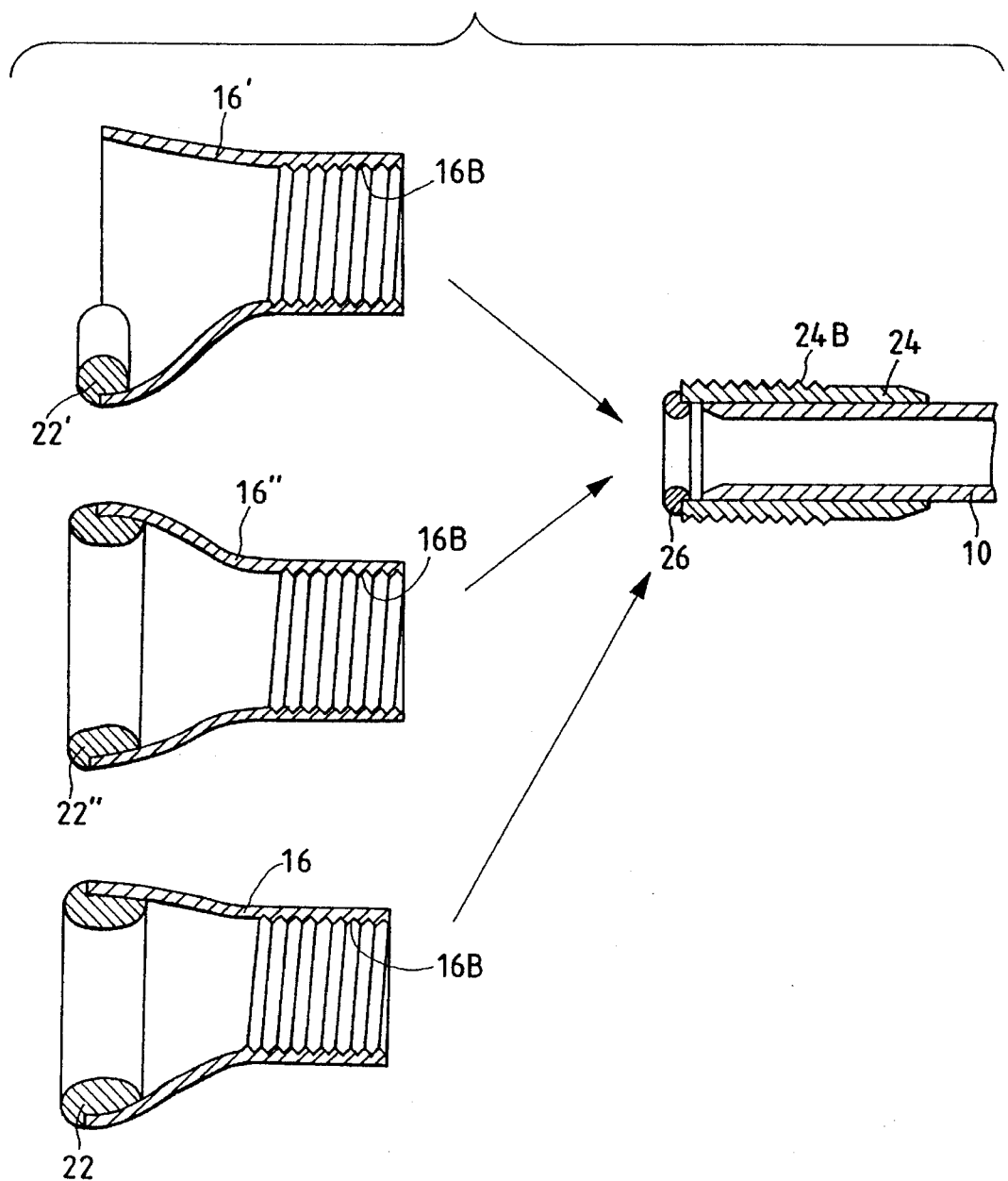
FIG. 10 shows a further embodiment of the present invention wherein a selected one of several embodiments of the line guide invention can be selected for a fishing condition or style.

FIG. 10 shows a feature that an angler can select one from among a set of different type guide cylinders in accordance with a given fishing condition or fishing style. The upper one in FIG. 10 has a configuration similar to the second embodiment, the lower one has a configuration similar to the first embodiment, and the middle one has a configuration similar to a guide cylinder shown in FIG. 6 wherein circular cross-sections of the enlarged diameter cylindrical portion are concentric over to the leading end portion thereof with respect to the longitudinal axis L passing through the rod pipe 10.

As can be understood clearly from the foregoing description, according to the invention, if the fishing line guide cylinder is formed such that the diameter thereof is greater than the diameter of the inner periphery of the rod pipe leading end portion, then it is possible to reduce the area and force of the contact of the fishing line against the inner surface of the fishing line guide cylinder and with the guide member when the fishing line is played out or drawn in during the fishing operation, so that the resistance of the fishing line can be reduced. Also, generally, in the behavior of the fishing line during the fishing operation, the fishing line is contacted with some force against the inner periphery of the guide member mounted on the lower portion of the fishing line guide cylinder. However, since the lower inner surface of the fishing line guide cylinder is downwardly shifted and enlarged in diameter more greatly than the upwardly enlarged diameter of the upper inner surface of the guide cylinder, the contact resistance of the fishing line can be greatly reduced. That is, the fishing line can be smoothly played out or drawn in, with the fishing line resistance reduced. Also, this makes it possible to reduce the size and weight of the leading end portion of the fishing rod with a pre-inserted fishing line guide member.

While the invention has been herein described in terms of the best mode contemplated by the inventor, the foregoing description is not intended to be limiting in any respect to those of ordinary skill in the field.

What is claimed is:

1. A fishing line guide member for mounting on an end of a fishing rod pipe held generally horizontal during fishing, a fishline extends through the fishing line guide member into the fishing rod pipe and is generally pulled in a downward vertical direction during fishing, said line guide member comprising:

a forward portion engaging and mounted on the end of the fishing rod pipe;

a rearward portion connected to said forward portion, said rearward portion is in contact with and guides the fishing line into the rod pipe, said rearward portion being enlarged in diameter with respect to said forward portion, an end of said rearward portion opposite said forward portion defining a passage for the fishing line and including a periphery, said periphery being offset asymmetrically with respect to an axis passing longitudinally through said line guide member and the rod pipe.

2. A fishing line guide member as in claim 1, wherein:

a width dimension of said periphery measured from radially inside to radially outside varies from comparatively smaller to larger as said offset from said axis increases.

3. A fishing line guide member as in claim 2, further comprising:

a wear resisting guide member, including curved inner peripheral surface mounted at least on a lower inner surface of a leading end of said rearward portion of said periphery of said fishing line guide member.

4. A fishing line guide member as set forth in claim 2, wherein said fishing line guide member has a transverse section in which said width dimension in a right and a left directions is smaller and said width dimension in the downward vertical direction is comparatively larger.

5. A fishing line guide member as set forth in claim 1, wherein:

said forward portion is freely rotatable about said longitudinal axis with respect to said fishing rod pipe.

6. A fishing line guide member as in claim 1, further comprising:

a wear resisting guide member, including curved inner peripheral surface mounted at least on a lower inner surface of a leading end of said rearward portion of said periphery of said fishing line guide member.

7. A fishing line guide member as set forth in claim 6, wherein:

said wear resisting guide member includes a rotatable member which rotates about an axis transverse to said longitudinal axis of said rod pipe.

8. A fishing line guide member for mounting to a fishing rod pipe defining a longitudinal axis, said line guide member comprising:

a forward portion for engaging and mounting to an end of said fishing rod pipe;

a rearward portion connected to said forward portion for contacting and guiding said fishing line into said rod pipe, said rearward portion having an internal surface shaped as a funnel to define a gradually enlarged space extending from a terminus of said of said fishing rod pipe in said longitudinal axis; and a plurality of wear resisting members, fixed on said internal surface of said rearward portion, each including an inner peripheral surface formed as a curved surface and located in said enlarged space, wherein said wear resisting members are spaced from each other in said longitudinal direction and arranged so that a minimum distance between said longitudinal axis and said inner peripheral surface of a first wear resisting member is smaller than a minimum distance between said longitudinal axis and said inner peripheral surface of a second wear resisting member located further from said terminus than said first wear resisting member.

9. A fishing line guide member as in claim 8, wherein one of said wear resisting members, located nearest to said terminus, is in abutment with said terminus.

10. A fishing line guide member as in claim 9, wherein said nearest one of said wear resting members has an inner diameter smaller than an inner diameter of said terminus.

11. A fishing line guide member as in claim 8, wherein said forward portion includes a first portion of a holding member attached to said end of said fishing rod, and said rearward portion includes a second connecting portion of said holding member projected from said terminus.

12. A fishing rod according to claim 11, wherein said second portion of said holding member supports one of said wear resisting members, which is located nearest to said terminus.

13. A fishing rod according to claim 8, wherein said rearward portion includes a hole formed therethrough.

* * * * *